Figure 1:
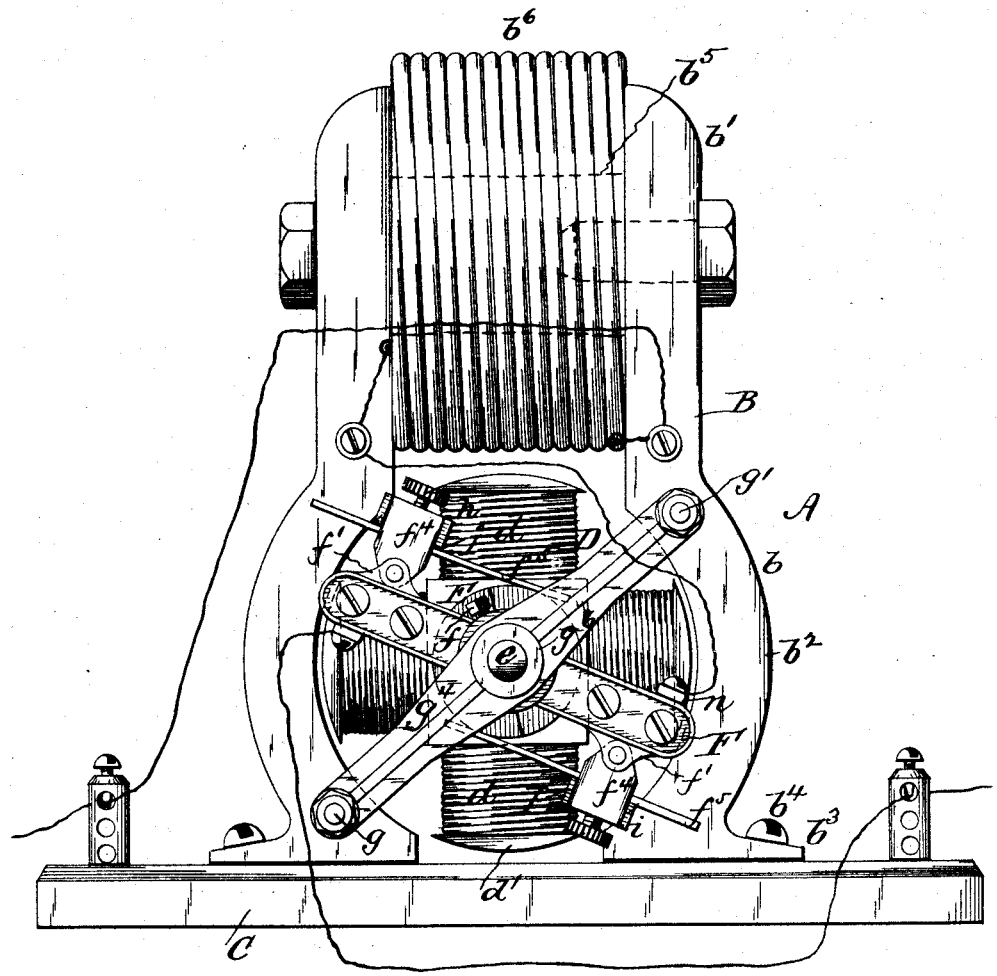

(No Model.)  2 Sheets—Sheet 1.

P. B. WALSH.
ELECTRIC MOTOR.

No. 421,790.  Patented Feb. 18, 1890.

WITNESSES:  INVENTOR,
Wm H Van Horn  Philip B. Walsh
M. H. Walker  By S. J. Van Stavoren
  ATTORNEY (No Model.) 2 Sheets—Sheet 2.
P. B. WALSH.
ELECTRIC MOTOR.
No. 421,790. Patented Feb. 18, 1890.
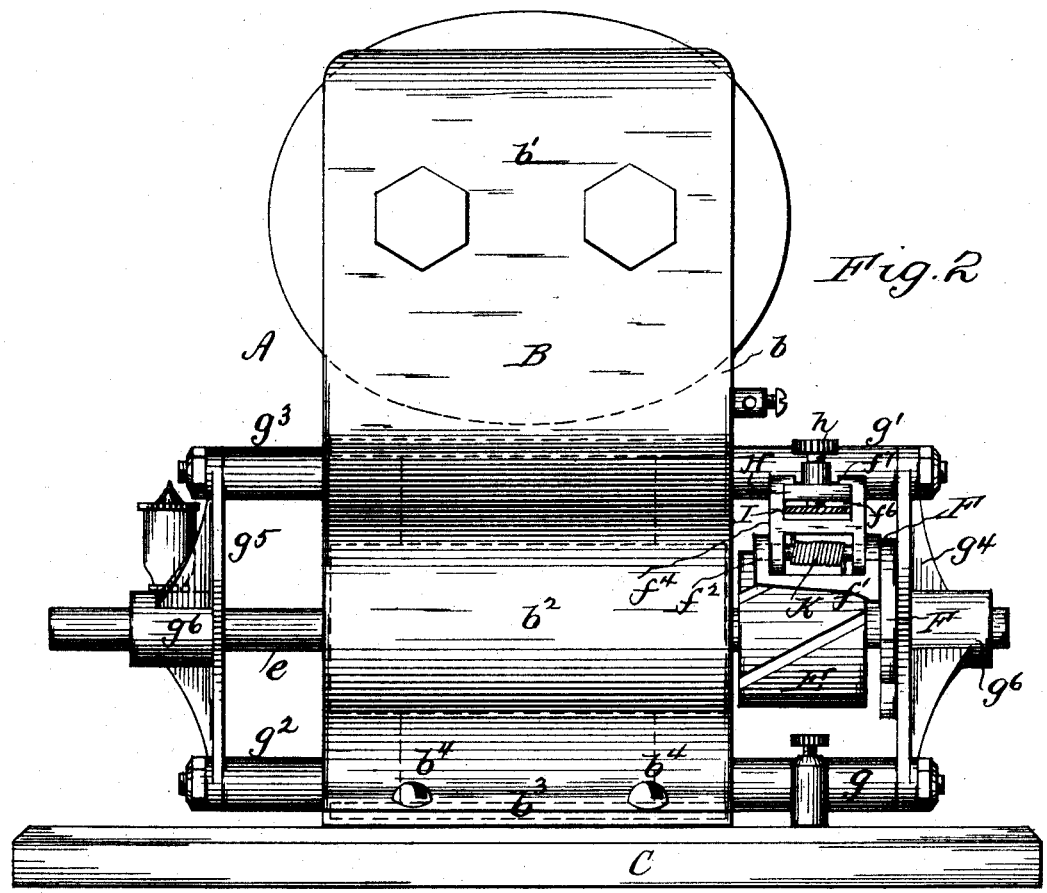
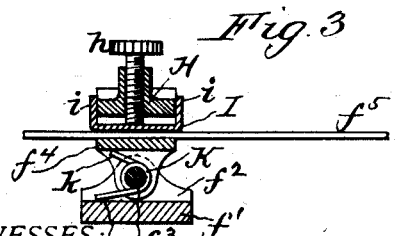
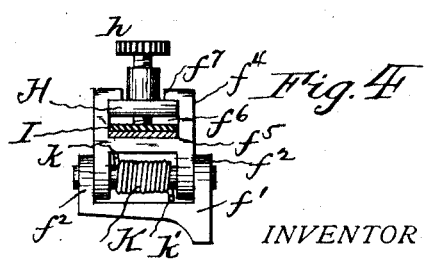
WITNESSES:
Wm H Cauthorn
M. W. Walker
INVENTOR
Phillip B. Walsh.
By S. J. VanStavoren
ATTORNEY

UNITED STATES PATENT OFFICE.

PHILLIP B. WALSH, OF PHILADELPHIA, PENNSYLVANIA, ASSIGNOR TO CHARLES M. RHODES, OF SAME PLACE.

ELECTRIC MOTOR.

SPECIFICATION forming part of Letters Patent No. 421,790, dated February 18, 1890.

Application filed October 3, 1888. Serial No. 287,102. (No model.)

*To all whom it may concern:*

Be it known that I, PHILLIP B. WALSH, a citizen of the United States, residing at Philadelphia, in the county of Philadelphia and State of Pennsylvania, have invented certain new and useful Improvements in Electric Motors, of which the following is a specification.

My invention has relation to electric motors; and it has for its object simplicity of construction of parts to provide an inexpensive, durable, and compact form of motor especially applicable for operating or running light machinery or that requiring but small amount of power.

My invention accordingly consists of the combinations, constructions, and arrangements of parts, as hereinafter described in the specification and pointed out in the claims, reference being had to the accompanying drawings, wherein—

Figure 1 is an end elevation of an electric motor embodying my improvements. Fig. 2 is a side elevation of same. Fig. 3 is a longitudinal section of brush-holder detached from the motor; and Fig. 4 is an end view, partly sectional, of same.

A represents the motor, composed of a field-magnet frame B, base-plate C, armature D, having commutator E, and brush-holder F. The field-magnet frame B consists, essentially, of two sides $b$ $b$, preferably of cast-iron, having straight or parallel upper ends $b'$ $b'$ and curved or bowed lower ends $b^2$ $b^2$, with preferably outside feet or flanges $b^3$ $b^3$, for screw or other connection with the base-plate C, as indicated at $b^4$. The parallel upper ends $b'$ of the sides $b$ are connected by a bar of soft iron $b^5$, which may be screwed, bolted, or otherwise connected to both said ends, as indicated more plainly in Fig. 1 of the drawings, to form a core for the field-magnet helix or coil $b^6$, located between the ends $b'$ $b'$.

$g$ $g'$ and $g^2$ $g^3$ represent brass or other non-magnetic posts secured to each edge or end of the sides $b$, one at each end thereof, as shown, to which are respectively secured cross-bars $g^4$ $g^5$, so as to be removable from said posts. The said cross-bars have bearings or boxes $g^6$ for the armature-shaft $e$.

The armature D may be of any suitable form. In the drawings I have shown it composed of radially-arranged coils or helices $d$, wound parallel to the axis of the shaft $e$ and having exposed pole-pieces $d'$ curved to conform to the bend or curve of the lower ends $b^2$ of sides $b$, which ends $b^2$ therefore form the pole-pieces for the field-magnets. Suitably sleeved or mounted either on the armature-shaft $e$ or on a hub on the cross-bar $g^4$ is the brush-holder bar F, having, if desired, a set-screw $f$ for holding the bar in its adjusted position; or any other well-known fastening devices may be substituted for said screw $f$. Secured to or forming an integral part of each end of the brush-holder bar F are laterally-projecting brackets or supports $f'$, having lugs $f^2$ $f^2$, to which are loosely hinged or pivoted, by means of pintles $f^3$, the holders $f^4$ for the brushes $f^5$. The upper parts of the holders $f^4$ are longitudinally slotted from end to end, as indicated at $f^6$, and the top edges of these slots have approaching flanges $f^7$ $f^7$. In each said slot $f^6$ is located a loose block H, through which passes a screw $h$, bearing against a plate I, located in the slot beneath block H.

Plate I is provided with turned-up ends or edge flanges $i$, which are located outside of and adjacent to the ends of the holder, and said ends project up to near the top of the holder in order to keep the block H in position in the slot.

Between the plates I and the bottom of the slots $f^6$ in holders $f^4$ are located the brushes $f^5$, so that by adjusting the screws $h$ in blocks H a clamping-pressure is applied to the plates I and the brushes $f^5$ to firmly maintain the brushes in the holders $f^4$, and said brushes are readily adjustable longitudinally in the holders to take up wear of same. Surrounding the pintles $f^3$ is a spiral spring K, one end $k$ of which bears against the lower side of pivoted holders $f^4$, and the other end $k'$ abuts against the bracket $f'$, so that the pressure of said springs K acts to keep the brushes normally in contact with the commutator E, each brush having its individual spring-pressure contact with commutator. The latter may have its segments arranged as desired. In the drawings they are shown inclined to the axis of the shaft $e$. The brackets $f'$ and the brush-holders $f^4$, pivoted thereto, are oppositely located on bar F, as shown, and on the brackets $f'$ are suitably located binding-posts $n$ for circuit-connections with the field-magnet and line.

The armature and field-magnet coils may be in series relation, as indicated, or in other circuit relation, as desired.

By securing the boxes or bearings for the armature-shaft to the sides $b$ of the field-magnet frame no special bed-plate need be made for the motor. The machine or other metal fixture to which the motor is attached answers for said base-plate.

What I claim is—

In an electric motor, in combination with a brush, the herein-described brush-holder, mounted on a brush-holder bar having brackets $f'$, provided with lugs $f^2 f^2$, to which the brush-holder is loosely hinged or pivoted by means of pintle $f^3$, and consisting of holder $f^4$, having slot $f^6$ and approaching top flanges $f^7$, a loose block H in said slot, a set-screw $h$, passing through said block and in contact with a plate I, located within said slot and having turned-up ends $i$ to the exterior of the holder $f^4$ and adapted to hold the loose block H in place within the slot, spiral spring K on said pintle $f^3$, one end of which $k$ bears against the lower side of holder $f^4$ and the other end abuts against the bracket $f'$ to keep the brush normally in contact with a commutator, substantially as described, and for the purposes set forth.

In testimony whereof I affix my signature in presence of two witnesses.

PHILLIP B. WALSH.

Witnesses:
W. E. SHARP,
S. J. VAN STAVOREN.